United States Patent [19]

Reilly

[11] 4,265,370

[45] May 5, 1981

[54] PORTABLE LIQUID METERING DEVICE

[76] Inventor: David H. Reilly, 508 Solar Dr., Fort Lauderdale, Fla. 33301

[21] Appl. No.: 22,984

[22] Filed: Mar. 22, 1979

[51] Int. Cl.³ .............................................. B67D 5/30
[52] U.S. Cl. .................................. 222/25; 222/37; 222/70; 222/211
[58] Field of Search ............... 222/23, 25, 36, 37, 222/70, 153, 129.3, 129.4, 206, 211, 215

[56] References Cited

U.S. PATENT DOCUMENTS

| 3,170,597 | 2/1965 | Reichenberger | 222/36 |
| 3,181,729 | 5/1965 | Milonas et al. | 222/36 |
| 3,248,009 | 4/1966 | Sutton et al. | 222/36 X |
| 3,257,034 | 6/1966 | Dumm | 222/36 |
| 3,920,149 | 11/1975 | Fortino et al. | 222/129.3 X |

Primary Examiner—Joseph J. Rolla
Attorney, Agent, or Firm—Joseph Zallen

[57] ABSTRACT

A portable liquid metering device for detachably securing to the opening of a liquid container and adapted to discharge a predetermined volume of liquid upon tipping and having a register for counting and displaying the number of times the bottle is tipped.

4 Claims, 5 Drawing Figures

PORTABLE LIQUID METERING DEVICE

BACKGROUND OF INVENTION

This invention relates to a portable liquid metering device. In particular it relates to such a device which can be inserted in the neck of a bottle, as for example, a bottle of liquor.

The prior art as examplified by U.S. Pat. No. 2,882,086; 3,428,218; 3,688,947; 3,993,218; 3,170,597; 3,257,034, and 3,599,833 and does not describe a commercially satisfactory device.

One object of this invention is to provide a portable liquid metering device which can be inserted on top of a bottle and automatically deliver a predetermined measured amount of liquid in a rapid manner by the simple act of tipping the bottle.

Another ojbect of this invention is to provide such a device which will count and store information relating to the quantities dispensed, which information can be readily obtained at a later time.

Yet another object of this invention is to provide such a device which will automatically provide information as to the number of bottles in which the device has been inserted.

Other objects and advantages of this invention will be apparent from the description and claims which follow taken together with the appended drawings.

SUMMARY OF INVENTION

This invention comprises broadly a portable liquid metering and dispensing device adapted to be fitted into the opening of a container such as a bottle. The device has an upper pouring spout which is connected by a conduit to an inlet in the lower end of the device within the neck of the bottle. Means are provided for normally blocking the passage of liquid through the conduit by a valve or the like. When the bottle is tipped a switch actuates means which unblock the conduit for a predetermined period of time and then reblock it. Thus, when the device inserted into a bottle is in inverted position liquid from the bottle passes from the inlet through the outlet to a glass for a period of time which correlates with the desired volume of liquid. As long as the bottle is kept inverted no further flow will occur. However, when the bottle is turned right side up the tipping switch can then be reactivated by tipping the bottle.

In its preferred form a logic circuit is provided which upon a signal from the tipping switch activates the means to open the conduit and then re-activates the means to close the conduit and also both counts and displays the number of times this action takes place. The tipping switch can be a mercury switch or other switch sensitive to its position with respect to gravity as for example, a sliding magnet switch. The valve is preferably a pinch valve operated by a cam or gear. It is also preferred that the device include a bottle removal counter and display which will count and display the number of times the device is removed from a bottle by means of a switch. Further, in order to give security to the device the actual reading of the display could be arranged to be actuated by a magnetic reed switch responsive to an independent magnet.

SPECIFIC EXAMPLE OF INVENTION

Figure 1:
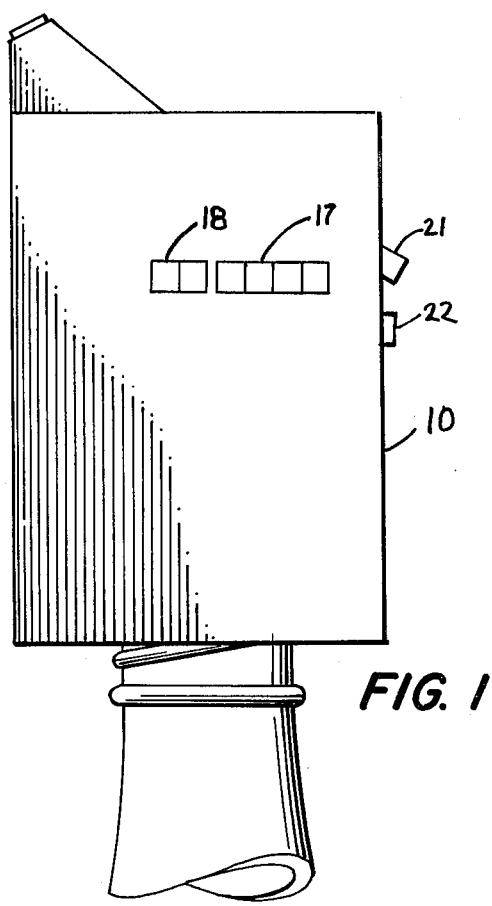
FIG. 1 is a perspective view of a device made in accordance with this invention inserted into the neck of a bottle.

Referring now to the drawings the device illustrated comprises a housing 10 having an upper pour spout 10a and a flexible conduit 13 such as latex rubber tubing. Flexible conduit 13 is attached to a rigid conduit 14 which leads to an inlet 15 in a bottom means 19 for securing to a bottle. An air tube 16 having a check valve 16a extends through the inlet and housing to the outside air.

Within the housing is a motor 11 which drives a member 12, which member has a projection 12a normally pinching flexible conduit 13 in conjunction with spring 12a against rigid wall 12c. Upon proper actuation of the motor projection 12a is removed thus permitting flow of liquid through the conduit. Further actuation of the motor causes projection 12a to pinch the conduit and block the flow of liquid in the conduit. An on/off switch 21 is provided as well as a knob 22 for adjusting the duration of time that the conduit is left open and hence in proportionate amount to the flow of liquid that is discharged from the bottle.

A logic circuit 100 is provided such as a micro processor circuit which acts so as to control the motor 11 in response to a tipping switch 24 which can for example be a mercury switch or a sliding magnet switch 24a having a magnetic slug 24c engaging reed switch 24b. A DC source 20 such as a 9-volt battery powers the entire device and since the motor operates in short pulses to open and close the circuit pour valve 12, very little power is consumed. The logic circuit 100 has means for counting and displaying the number of times there are pairs of motor pulses and thus counts the number of times there is dispensing from the bottle, sometimes referred to as shot count 17. In addition the logic circuit provides for counting the number of times the device is removed from a bottle, hence the number of bottles with which the device has been used, display 18. Such information as shot count 17 and bottle count 18 are vital and important information for the control at bars where liquor is dispensed. In order to increase security further, the actual display of the stored information is not visible except when the user passes a magnet over a magnetic reed switch whereby the LED diplay becomes visible. A typical setting of the motor 11 is such that a pulse rotates the motor ten revolutions in one direction and after the time delay which can be varied by control 22, the motor is reversed in polarity to make ten revolutions in the reverse direction.

Figure 5:
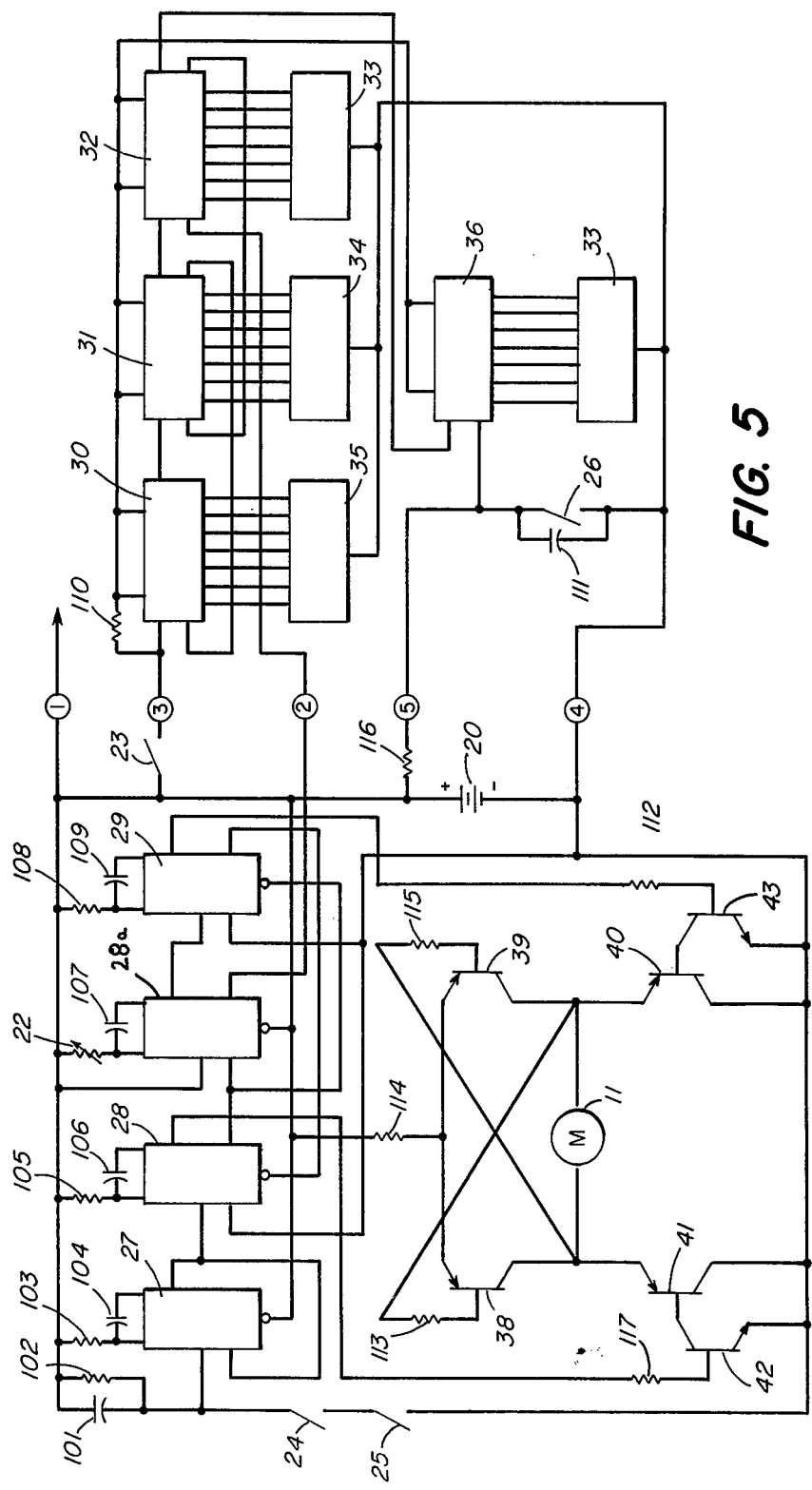
FIG. 5 is a circuit diagram of the electrical aspects of the invention.

In the circuit exemplified in FIG. 5 the basic elements of the driving system are dual mono stable multi vibrators 27, 28, 28a, 29 (RCA COS/MOS Digital Integrated Circuits, high voltage B series, RCA CD 3098B.) The display elements 30, 31 and 32 actuate light emitting diodes, 33, 34 and 35 so as to give the shot count display 17 while circuit 36 actuates light emitting diode 33 for the bottle count 18. Resistor 103 and fixed capacitor 104 are associated with circuit 27, resistor 105 and fixed capacitor 106 are associated with circuit 28a, and resistance 108 and capacitors 109 are associated with circuit 29.

The switching and power arrangement comprises battery 20 whose positive side is connected to switches as follows:

(a) Through the noise filter comprising capacitor 101 and resistor 102 to tipping switch 24.

(b) Through tipping switch 24 to shot count switch 25 which activates the motor 11 and its associated controls in accordance with signals from the micro processor.

(c) To bottle switch 26 which has noise filter capacitor 111 in series with resistance 116.

(d) To magnetically activated reed switch 23 for activating the display section of the device.

The DC motor 11 is connected across transistors 38, 39, 40 and 43, which in conjunction with transistors 41 and 42 with resistances 112, 113, 114, 115 and 117 provide switching control for the motor from the micro processor elements 27, 28, 28a, and 29. Resistors 113 and 115 are base-limiting resistors for transistors 38 and 39. Resistors 112 and 117 are base-limiting for transistors 40 and 43. Transistors 41 and 42 act as level transition switches in going from the micro-processor elements 27, 28, 28a and 29 to the motor switches.

Components which can be used in the circuitry of this invention are commercially available; thus, ultra-miniature slide switches of the dual wipe type are available from UID. Fixed variable resistors are available from a number of different sources as are capacitors. Seven-segment light emitting diodes are available from Monsanta. Integrated circuit components for the logic circuit are available from RCA and from Intersel, Inc. Counters and encoders are available from National Semi-Conductor. Mercury switches are available from a number of sources including Gordos Corp. and reed switches are also obtainable from Gordos.

It should be noted that the embodiment illustrated and described herein requires no chamber for storage of liquid prior to dispensing. While the bottle with the dispensing device attached is in the normal upright position there is no liquid in the device. As soon as the device is tipped the conduit 13 is unblocked for a short period of time permitting instant pouring and each pour is automatically counted and the count is available for display. Adjustment of the pour size from for example one sixteenth to six ounces is accomplished by adjustment of the potentiometer 22 which adjusts the length of time that the conduit is unblocked. Since the entire logic and display circuit is contained within the device itself there is no need for auxilliary devices in order to keep an accurate control of the number of drinks that are served from particular bottle or the number of bottles with which the device has been associated.

Another particular advantage of this embodiment is that the consumption of power is so low that the battery rarely needs changing. The preselected time delay during which the liquid is flowing out by gravity does not consume any power since the only time the motor is on is during the short pulses for blocking and unblocking.

Figure 2:
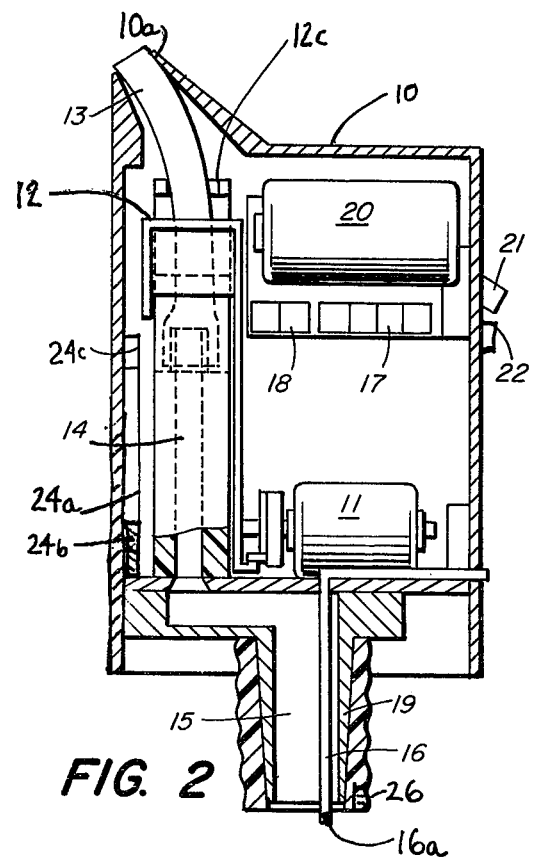
FIG. 2 is a partial cross-section view.
Figure 3:
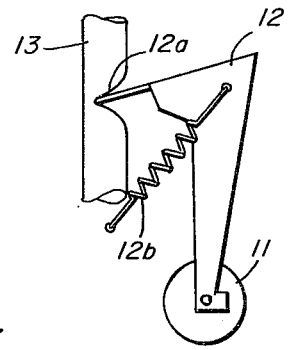
FIG. 3 is an enlarged diagrammatic view of the motor and cam.
Figure 4:
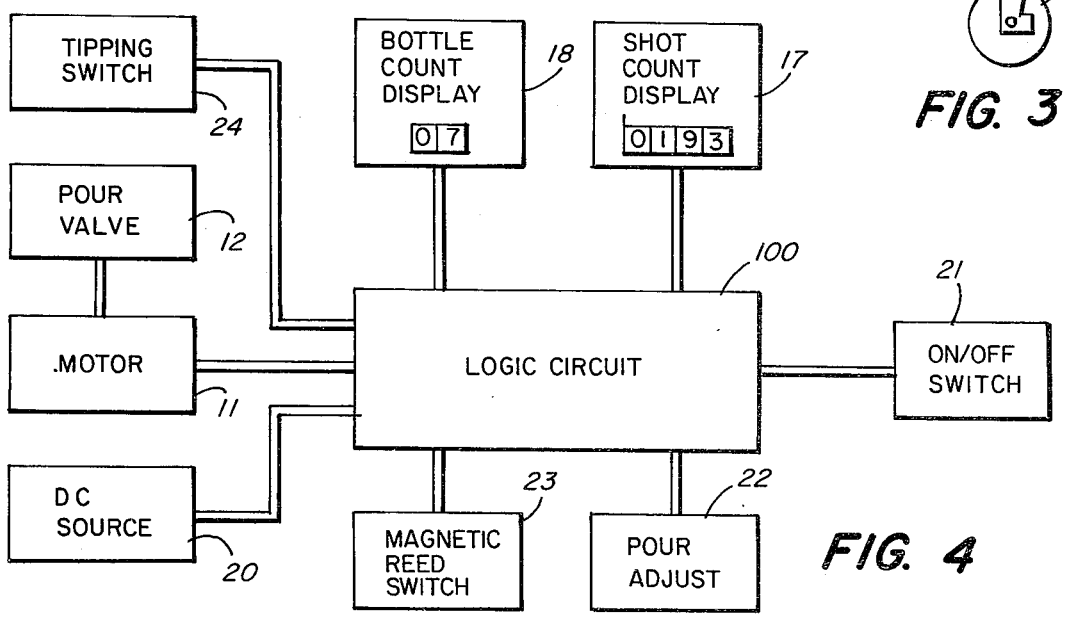
FIG. 4 is a block diagram of the invention.

The magnet slide switch illustrated in FIG. 2 whereby the switch is activated by the magnetic slug sliding by gravity to the magnetic reed switch can also be used to give a fast double pour by a slight shake which would unlatch the circuit and then permit the unblocking-blocking cycle to be repeated. It should be noted that the circuit is so arranged that reopening of the pour switch, be it the magnetic slide switch, or the mercury switch, is required before the unblocking-blocking cycle can be repeated.

While the illustrated embodiment is limited to metering, dispensing and counting a shot size which can be varied by adjustment of the potentiometer, it is also feasible although not illustrated, to have an additional micro processor-display circuit which can be alternately used for a preselected larger size volume. Thus for example an additional switch will give the user the chance to deliver one ounce shots or two ounce shots.

In addition to having the shot counts and bottle removal counts stored in the portable device of this invention, such information could by state of the art techniques be transferred to another logic device which could monitor a large number of portable devices.

I claim:

1. A self-contained portable liquid metering and dispensing device comprising: a housing (10) having upper pouring means (10a) and lower inlet means (19) for detachably securing to the opening of a liquid container; air means (16) extending through said housing into said lower means (19); conduit means connecting said pouring and lower means and including a flexible resilient portion (13), means (12a) for pinching off flow in said resilient portion (13), a reverse polarity motor means (11) connected to and actuating said pinching means (12a); power means (20) for actuating said motor means (11); movable magnet means (24b) moved by tipping of the device; switch means (24) actuated by said magnet means (24g); logic means (100) actuated by said switch means (24) to cause said motor means to rotate to release said pinching means (12a) from said resilient portion (13), stop rotation for a predetermined period of time and then rotate on reverse to pinch off said resilient portion (13); and means (17) for counting and displaying the number of actuations of said switch means (24); all of said means being carried completely by said housing.

2. The device of claim 1 wherein means (22) carried by said housing are provided to vary said predetermined period of time.

3. The device of claim 1 wherein means (18) carried by said housing are provided to count and display the number of times the device is removed from the liquid container.

4. The device of claim 1, 2 or 3 wherein display is not visible except when user passes a magnet over a magnetic reed switch means (23) carried by said housing and connected to said logic means (100).

* * * * *